Feb. 27, 1968　　　　E. A. FREDELAKE　　　　3,370,309
RETRACTABLE WHEEL SYSTEM FOR PONTOON RAFTS
Filed Nov. 7, 1966　　　　　　　　　　　　2 Sheets-Sheet 1

INVENTOR.
EDWARD A. FREDELAKE
BY
*Robert E Breidenthal*
ATTORNEY

INVENTOR.
EDWARD A. FREDELAKE
BY
*Robert E. Breidenthal*
ATTORNEY

United States Patent Office 3,370,309
Patented Feb. 27, 1968

3,370,309
RETRACTABLE WHEEL SYSTEM FOR
PONTOON RAFTS
Edward A. Fredelake, P.O. Box 164, Spearville
Township, Ford County, Kans. 67876
Filed Nov. 7, 1966, Ser. No. 592,509
10 Claims. (Cl. 9—1)

ABSTRACT OF THE DISCLOSURE

A retractable wheel system for a vessel having a leaf spring which is connected at one end to the frame of the vessel and at the other end to a main strut for a wheel by means of an auxiliary strut.

---

This invention relates to new and useful improvements in retractable wheel systems, and more particularly pertains to a system of such character especially well suited for use with watercraft to impart an amphibious character to the latter and enable towing by land vehicles, and wherein a detachable coupling is provided between each wheel and its independent spring suspension, whereby the wheel may be freely moved into a raised retracted position.

More specifically, the present invention has to do with new and useful improvements in apparatus of such character as disclosed in the following listed U.S. patents:

Retractable Wheel Assembly for Boats, 2,781,529, Moody, Feb. 19, 1957;
Trailer Mechanism, 3,095,585, Thomas, July 2, 1963;
Boat Trailer, 2,457,567, Kuns, Dec. 28, 1948;
Rafts, 3,114,167, Stockmann, Dec. 17, 1963;
Amphibious Pontoon Boat, 3,042,942, Howe, July 10, 1962;
Boat With Retractable Wheels, 2,740,135, Church, Apr. 3, 1956;
Amphibious Trailer Boat, 2,831,203, Kanarr, Apr. 22, 1958;
Retractable Wheel Assembly, 3,210,784, Krance, Oct. 12, 1965;
Water Vehicle, 3,210,783, Petty, Oct. 12, 1965;
Amphibious Device of the Foldable Outrigger Type, 2,759,202, McKinney, Aug. 21, 1956.

The primary object of the present invention is to provide a retractable wheel assembly that includes a spring suspension so as to provide a smooth ride over rough terrain, and wherein the spring suspension can be rendered ineffective to oppose upward retraction of the ground or support wheel.

Another object of the invention is to provide a retractable wheel system of the character specified in the preceding paragraph wherein the water displacement buoyancy of the support wheel can serve to both reduce the physical effort required to retract the wheel and to reduce the shock of lowering the wheel to its supporting position.

Still another important object of the present invention is to provide a means useful for both raising the wheel to its retracted position and for selectively retaining the wheel in its retracted position.

A final object to be specifically enumerated herein is to provide a retractable wheel system of extreme ruggedness and durability that will be highly reliable in use and simple to operate, and which yet will be simple and economical to manufacture.

An important aspect of the invention involves, in combination with a transport that includes a frame, a retractable wheel system comprising an elongated main strut having spaced first and second end portions, said first end portion of the main strut being pivotally connected to the frame for upward swinging movement of the main strut between first and second positions, said main strut in its first position being downwardly inclined from its pivotal connection to the frame, a ground wheel rotatably mounted on the second end portion of the main strut, the arrangement being such that the ground wheel is in a frame supporting, extended position and in a relatively elevated, retracted position when the main strut is in its first and second positions, respectively, means selectively operative for yieldingly opposing upward swinging movement of the main strut comprising spring means fixed to the frame at a position towards which the main strut moves on swinging from its first position toward its second position, an auxiliary elongated strut having first and second end portions, for connecting the first end portion of the auxiliary strut to the spring means, and second connecting means for connecting the second end portion of the auxiliary strut to an intermediate portion of the main strut, with one of the connecting means establishing a detachable connection and the other of the connecting means establishing a pivotal connection whereby said auxiliary strut can be swung from a position opposing relative closing movement of the spring means and the main strut as occurs on the latter moving to its second position, and means for detachably securing the main strut in its second position.

Another aspect of the invention involves, in a retractable wheel system, the improvement comprising a frame element, an elongated main strut having a first end pivotally mounted on the element for swinging movement about a horizontal axis and a second end portion that is horizontally and laterally offset for accommodating a ground wheel alongside such second end portion in a vertical plane coincident with the pivotal mounting of the main strut, said main strut being downwardly inclined from the frame element in one direction, a stub axle carried by the second end portion of the main strut parallel to the axis of the pivotal mounting of the main strut, a ground wheel mounted on the stub axle for rotation in said vertical plane, a leaf spring having one end fixed to the frame element and extending therefrom in said one direction in spaced relation above the main strut to terminate in a free end that is yieldingly flexible and disposed directly above the main strut and in said vertical plane, an elongated auxiliary strut disposed in said vertical plane and having a lower end pivotally secured to the main strut about an axis parallel to the axis of the pivotal mounting of the main strut in an arrangement such that the auxiliary strut can be swung to a position of resting engagement on the ground wheel, said strut having an upper end, and means detachably connecting the upper end of the auxiliary strut to the free end of the spring, whereby the auxiliary strut can selectively oppose closing and opening movement of the main strut with respect to the free end of the spring, and whereby the main strut can be swung upwardly when the auxiliary strut is detached from the free end of the spring and swung into a position of repose on the ground wheel.

An important feature of the invention resides in the provision of an auxiliary strut having a lower end pivotally connected to an intermediate portion of the longitudinal extent of the main strut, and which auxiliary strut being provided with means for detachably coupling its other end to a resilient yieldable portion of spring means, whereby relative closing movement of the spring means and the main strut is opposed by the auxiliary strut when the latter is connected to the spring means, with such opposition being removed upon the auxiliary strut being disconnected from the spring means.

Another important feature of the invention resides in the detachable connection between the auxiliary strut and the spring means being disposed at a position readily accessible to occupants of the transport.

Still another feature of the invention resides in the retractable wheel system being of minimal lateral breadth, whereby two units can be disposed upon opposite sides of a transport, such as a pontoon raft, and not greatly increase the overall width of the transport so equipped so as to constitute a road hazard when being towed by a land vehicle, and to a considerable extent such minimal width of the system resides in only the lower or free end portion of the main strut being laterally offset to accommodate the ground or support wheel.

These and other objects, aspects, features and advantages of the invention will become abundantly clear during the ensuing description of the preferred embodiment of the invention, such description to be taken in conjunction with the accompanying drawings, wherein.

Figure 1:
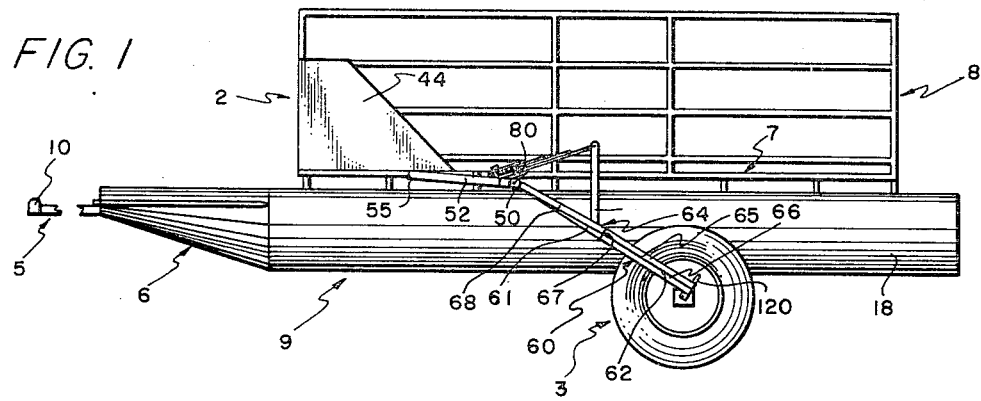
FIGURE 1 is a side elevational view of a pontoon raft having a draft tongue for towing purposes (such tongue being fragmentarily shown), and provided with a retractable wheel systems according to the invention, the ground support wheels being shown in their lowered or extended operative positions so as to constitute a combination suitable for towing over land.

Referring now to the drawings, wherein like numerals designate like parts throughout the various views, the numeral 2 designates generally an amphibious transport that includes retractable support wheel systems 3 and 4.

The amphibious transport 2 is in the form of a raft designated generally at 5, the latter being comprised of a generally rectangular, horizontally disposed open steel framework of preferably welded construction designated generally at 7 that has fixed thereto, preferably by welding, an upstanding peripheral steel fence designated generally at 8, and buoyant means designated generally at 9. The tongue or draft means 5 is centrally disposed at the front of the transport 2, is fixed to the framework 7, and includes a conventional tow hitch 10 which serves in the conventional manner, as will be understood, for detachably coupling the transport 2 to coacting towing structure of a draft vehicle such as of an automobile, not shown.

The framework 7 includes spaced, parallel side rails 12 at opposite sides thereof which are connected by bracing structure that includes a plurality of cross members such as those shown at 14.

A flat deck 16 (preferably of plywood or the like, though it can be of any material such as sheet plastic or metal, or expanded metal) is mounted in any suitable manner upon the top of the framework 7, whereby passengers and cargo can be supported by the raft 6.

The buoyant means 9 is comprised of a pair of air-filled, airtight steel pontoons 18 and 20, such pontoons being in the form of elongated cylinders that are preferably upwardly and forwardly tapered in their forward end portions, as shown.

The pontoons 18 and 20 are horizontally disposed, parallel to and widely spaced from each other for raft 6 lateral or roll stability on rough water; the length of such pontoons, of course, contributing to stability against excessive fore and aft pitching.

Preferably the pontoons 18 and 20 are spaced below the framework 7 whereby the deck can be carried well above wave action and so that, when desired, the deck 16 can be of expanded metal without exposing passengers or cargo to being wetted therethrough except during extreme wave and wind conditions. It will be noted that when the deck 16 is expanded steel and welded to the rails 12 and cross members 14, the deck 16 serves additionally to reinforce and rigidify the framework 7, though such reinforcement is obtained with other deck materials to an extent determined by the strength of the latter and the security of its attachment to the framework 7.

The pontoons 18 and 20 are rigidly secured to the framework by any suitable means such as short lengths of angle iron constituting inverted V's welded at the spaced positions to the pontoons and to the cross members 14, such as those indicated at 22 and 24 in relation to the pontoons 18 and 20, respectively.

The forward ends of the pontoons 18 and 20 have welded thereto a horizontal brace 26 to which the rearwardly divergent tongue structure 5 is attached. Preferably the tongue structure is disposed below the brace 26 and is welded to both the brace 26 and adjacent sides of the pontoons 18 and 20.

Quite obviously, additional pontoons can be provided between the pontoons 18 and 20, if desired.

The upstanding peripheral wall or fence 8 that is disposed about the edges of the rectangular deck 16 is preferably in the form of upstanding steel posts such as those indicated at 28, 30, 32 and 34 having their lower ends rigidly welded to the side rails 12 and the cross members 14. The posts of the upstanding peripheral fence about the deck 16 are connected by vertically spaced steel rods or tubes such as those indicated at 36, 38 and 40, the rods having their opposite ends welded to the upstanding posts between which they extend. The upstanding fence posts such as those indicated at 28 through 34 as well as the guard rails or connecting rods such as those indicated at 36, 38 and 40 can conveniently be conventional steel pipe. It will be appreciated by those skilled in the art that the fence constituted of the posts 28 through 34, and the rods 36, 38 and 40 constitute a safeguard against persons from inadvertently falling overboard from the deck 16 of the raft when the latter is afloat. The protective fence 8 is provided with a relatively larger opening 42 at the rear of the deck 16 to facilitate passenger and cargo loading and unloading and affords a suitable location for the mounting of an outboard motor, not shown (it being understood that a transom, not shown, suitable for the type of motor chosen can be mounted at such location), whereby the raft 6 can be propelled on the water.

The fence 8 preferably includes an impervious wind screen across the front and the forward ends of the sides thereof such as indicated at 44, whereby protection is afforded against wind and spray. The screen 44 can be of canvas lashed to the fence 8 or of either sheet metal or plastic secured in any desired manner to the fence 8. The screen can be and preferably is in its entirety or at least in part made of a transparent plastic such as, for example, Lucite (trademark by DuPont) to afford visibility therethrough by the operator and his passengers.

The retractable wheel systems 3 and 4 are disposed on opposite sides of the raft 6, and are essentially identical to each other inasmuch as they are mere images of each other, that is, they are symmetrical with respect to a vertical medial plane of the raft 6. Accordingly, a detailed description of the retractable wheel system 3 will suffice for both of the systems 3 and 4.

Figure 4:
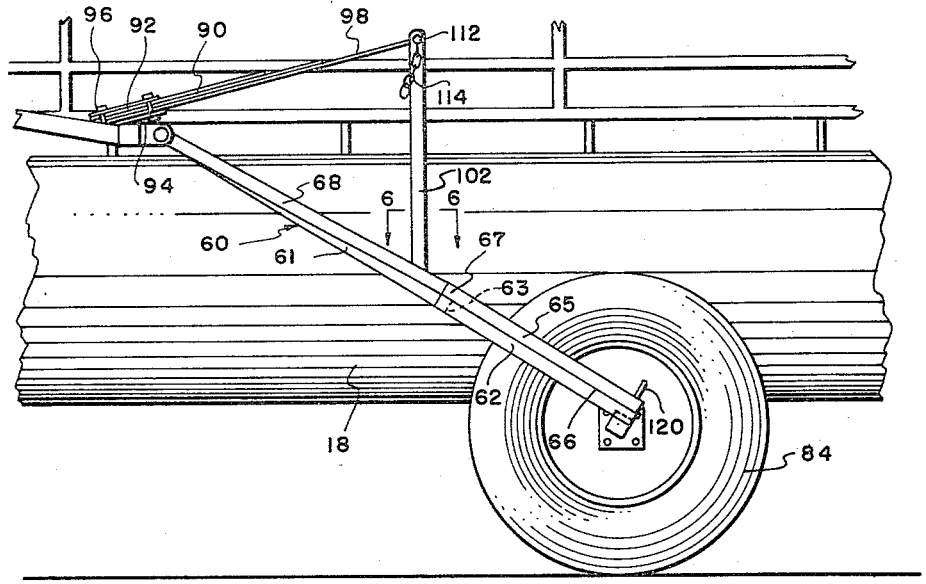
FIGURE 4 is an enlarged fragmentary elevational view of the structure shown in FIGURE 1, and illustrating particularly the retractable wheel system with the ground wheel in its operative extended position.
Figure 5:
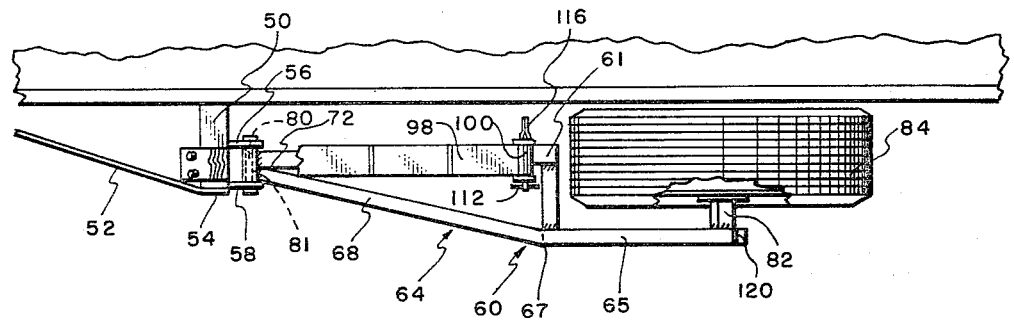
FIGURE 5 is a fragmentary plan view of one of the retractable wheel assemblies or systems, portions of the spring means and the pneumatic type ground wheel being broken away; and, FIGURE 6 is an enlarged fragmentary sectional view taken upon the plane of the section line 6—6 in FIGURE 4.
Figure 6:
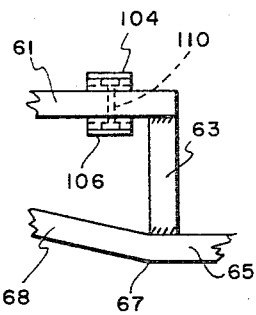

The retractable wheel system 3, as best shown in FIGURES 4, 5 and 6, is comprised of a steel bracket 50 rigidly and securely welded to the side rail 12 of the frame 7 to project laterally and downwardly therefrom. The bracket 50 is additionally braced by a steel strap 52 having a rear end 54 welded to the outer end of the bracket 50 and extending forwardly therefrom and inclined toward the center of the raft 6 with its forward end 55 being welded to the side rail 12 at a position spaced forwardly of the bracket 50.

The bracket is provided with an integral pair of spaced rearwardly extending and apertured lugs 56 and 58. An elongated main strut is designated generally at 60, the same being comprised of an inner and lower component that consists of coplanar and parallel steel bars or strut members 61 and 62 that overlap in their longitudinal extents joined by a short steel bar or strut member 63 extending perpendicular between and having its opposite ends welded to the overlapping extents of the bars 61 and 62. The bars 61, 62 and 63 are coplanar.

The strut 60 additionally includes an outer and upper component formed of a single elongated steel bar of strut member 64 having a first section 65 that is coextensive with the bar 62 and which is positioned flush on the top of and welded to the latter along its juncture 66 therewith. The bar 64 is bent at 67 adjacent the welded junction of the bars 62 and 63 to define a straight second section 68 that converges with the bar 61 from their respective positions adjacent the opposite ends of the bar 63. The free end of the section 68 is beveled to seat flush against the side of the bar 61 from which the bar 63 extends and is welded thereto as clearly indicated at 72 in FIGURE 5.

The strut 60 is pivotally mounted upon a pivot pin 80 extending through the apertured lugs 56 and 58 defining a horizontal axis perpendicular to the longitudinal extent of both the transport 2 and the strut member 61. The latter and the strut section 65 therefore swing in vertical planes parallel to the medial plane of the raft 6. The pivot pin 80 extends through a sleeve lined opening 81 in the strut 60 constituting a journal and the pin 80 is conventional and is removable from the lugs 56 and 58, the same being headed at one end, and having a cotter pin (not shown) therethrough at the other end to restrain a securing nut against inadvertent removal, as will be understood by those skilled in the art.

Adjacent its free end, the lower strut member 62 is provided with a stub axle 82 on which is rotatably mounted a ground support wheel 84, the latter including a pneumatic tire, as shown. The lower end portion of the strut 60 comprised of the bars 62 and 65 may be considered an offset portion thereof in an arrangement such that the medial plane of the wheel 84 and its plane of rotation is vertical and coincident with the strut member 61. The bar or brace 63 and the offset lower strut portion 62 and 65 jointly constitute a configuration closely spaced to the radial periphery and to the side of the wheel 84, respectively. It will be understood and as shown in the drawings the length of the bracket 50 affords clearance between the side rail 12 of the frame 7 and the side of the wheel 84 opposite the lower portions 62 and 65 of the strut 60.

As thus far described, the strut 60 is swingable between a downwardly and rearwardly inclined position such as shown in FIGURES 1 and 4 in which the wheel 84 is in transport supporting position (the wheel 84 in such supporting or extended operating position having its lowermost extent substantially below the pontoons 18 and 20, and also so as to have at least a large part of the pneumatic tire below the line of water immersion 86 of the raft 6 sufficient to support the raft) and a retracted position such as shown thereof in FIGURE 2, wherein the wheel 84 is above the line 86 of water immersion. The arrangement is such that when the raft 6 is immersed to the line 86, the displacement of water by the strut 60 and by the wheel 84 results in a buoyancy thereof such as to balance the strut 60 and the wheel 84 at a position intermediate the positions shown thereof in FIGURES 1 and 2, as will be appreciated.

Figure 2:
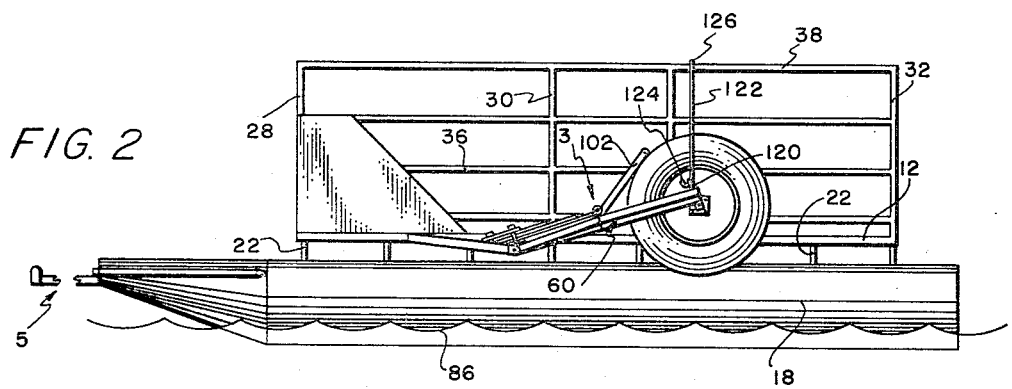
FIGURE 2 is a side elevational view generally similar to FIGURE 1; however, this view showing the combination with the ground support wheels elevated to their retracted positions, and with the combination being shown as floating upon water.
Figure 3:
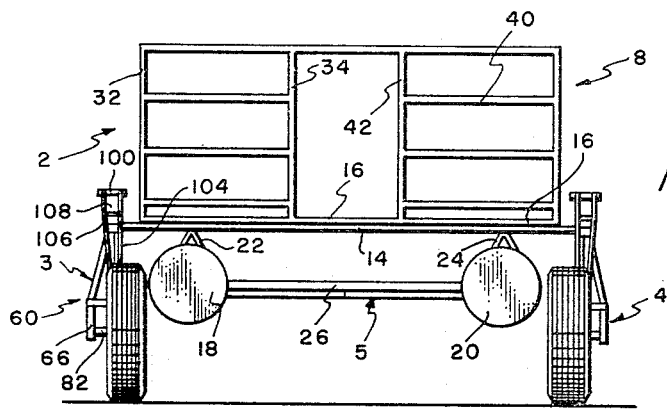
FIGURE 3 is a rear view of the structure shown in FIGURE 1.

A spring suspension system is detachably coupled to the strut 60 so as to resiliently and yieldingly oppose movement of the strut 60 from the position shown thereof in FIGURE 1 towards the position shown thereof in FIGURE 2. Such means conveniently takes the form in the preferred embodiment of the invention of a multileaf spring 90 (essentially in this instance the central or spring chair portion and one side of a conventional automotive spring) having the shackled multileaf portion 92 thereof fixedly attached to the bracket 50 at a position coincident with the plane of swinging movement to the strut member 61 and also of the wheel 84. The spring 90 can be secured to the bracket 50 by having the shackle plate 94 secured therethrough, not shown. The leaves of the spring 90 are disposed directly above the strut member 61, and in repose are preferably inclined upwardly and rearwardly as shown in FIGURE 2, the arrangement being such that spacing of the spring 90 above the strut 60 will accommodate the strut 60 being moved to the position shown in FIGURE 2 without interference.

The free rear end of the spring 90 is constituted of a single leaf 98 having an eye 100 formed at its extremity. The eye is substantially directly above the juncture of the strut member 61 with the brace 63.

An auxiliary strut 102 has its lower end pivotally secured to the strut member 61 adjacent the juncture of the latter with the brace 63 and is adapted to have its upper end detachably secured to the eye 100 or the free end of the spring 90. The auxiliary strut 102 is in and swingable in the medial plane of the wheel 84, whereby the strut 102, when detached from the spring 90 can be swung to an upwardly and rearwardly inclined position of rest upon the wheel 84 when the latter is retracted as shown in FIGURE 2.

The auxiliary strut 102 is comprised of spaced heavy gauge steel straps or bars 102 and 106 rigidly connected at spaced positions by welded spacers such as indicated at 108. The lower ends of the straps 104 and 106 are disposed on opposite sides of the strut member 61 and connected by a pivot pin 110 rotatably received through an opening in the member 61. The upper ends of the straps 104 and 106 are spaced to receive the eye 100 therebetween, and such upper ends of the straps 104 and 106 are apertured for alignment with the eye and removable insertion of a securing pin 112 through such apertures and the eye 100. The pin 112 is carried against loss thereof by means of a chain 114 attached to the strut 102. The pin 112 is retained against inadvertent dislodgment from its position securing the upper end of the strut 102 to the spring 90 by means of a cotter pin 116 extending therethrough, as will be understood.

Means is provided for releasably securing the strut 60 in the position shown in FIGURE 2, such means comprising an eye 120 fixed to the strut 60 adjacent the axle 82 and an elongated rod 122 having hooks 124 and 126 at its opposite ends detachably engageable with the eye 120 and over the fence bar 38.

The operation of the transport 2 will be readily understood. With the transport 2 in the condition shown in FIGURE 1, the same is towed to a launching site by a towing vehicle, not shown, in a manner quite analogous to the towing of a conventional two-wheel trailer.

The transport is pushed rearwardly into water at the shore line and decoupled from the towing vehicle. Such further pushing as may be necessary is accomplished, manually or otherwise, to force the transport into water of sufficient depth for the trailer to become entirely or largely water-borne, that is, the wheels 84 being clear of or bearing only slightly on the bottom.

Treating each wheel system 3 and 4 successively, the pins 112 are removed and the freed upper end of the auxiliary strut 102 is allowed to swing rearwardly. Concurrent with the transport 2 becoming water-borne, the wheel is buoyed upwardly, and it is a simple matter requiring little physical effort to position the system 3 as shown in FIGURE 2, this being accomplished by using the rod 122 to raise the wheel 84 (the hook 124 being engaged with the eye 120) until the hook 126 can be engaged over the fence bar 38.

To remove the transport from the water, the above procedure is reversed, it being noted that the wheel 84 can be simply dropped into the water, as buoyancy thereof will prevent the strut 60 from moving to the vertical position and prevent any shock to the raft or its occupants.

After the wheel systems 3 and 4 have been lowered or extended, the transport 2 is moved to the shore and pulled from the water with the systems 3 and 4 assuming the load.

The auxiliary struts 102 detachably coupling the main struts 60 to the spring suspensions affords a simple and effective means readily accessible to raft occupants to effect conversion of the transport from a land to water-borne unit, and vice versa.

The advantages of a spring suspension system are manifold and because of the obvious character do not require elaboration.

The illustrated preferred embodiment of the invention is of course readily susceptible to numerous variations well within the scope of ordinary skill in the light of this disclosure (as, for example, though not preferred, the employment of a coil disposed on the frame to have its lowermost end free at the spring portion 100 rather than the leaf spring) and minor improvements also deemed well within the scope of ordinary skill (as, for example, connecting a shock absorber between the free end of the spring (leaf or coil) and the frame 7 to obtain the usual function of such a common provision), and accordingly, attention is directed to the appended claims in order to ascertain the actual scope of the invention.

I claim:

1. In combination with a transport that includes a frame, a retractable wheel system comprising an elongated main strut having spaced first and second end portions, said first end portion of the main strut being pivotally connected to the frame for upward swinging movement of the main strut between first and second positions, said main strut in its first position being downwardly inclined from its pivotal connection to the frame, a ground wheel rotatably mounted on the second end portion of the main strut, the arrangement being such that the ground wheel is in a frame supporting, extended position and in a relatively elevated, retracted position when the main strut is in its first and second positions, respectively, means selectively operative for yieldingly opposing upward swinging movement of the main strut comprising spring means fixed to the frame at a position towards which the main strut moves on swinging from its first position toward its second position, an auxiliary elongated strut having first and second end portions, for connecting the first end portion of the auxiliary strut to the spring means, and second connecting means for connecting the second end portion of the auxiliary strut to an intermediate portion of the main strut, with one of the connecting means establishing a detachable connection and the other of the connecting means establishing a pivotal connection whereby said auxiliary strut can be swung from a position opposing relative closing movement of the spring means and the main strut as occurs on the latter moving to its second position, and means for detachably securing the main strut in its second position.

2. The combination of claim 1, wherein said one connecting means detachably connects the first end portion of the auxiliary strut to the spring means.

3. The combination of claim 1, wherein said spring means is of the leaf type and has a portion fixed to the frame and a free portion projecting therefrom in approximate parallelism to the extent of the main strut from its pivotal connection to the frame when in its second position, said free portion of the spring means being yieldingly flexible in a direction having a predominant vertical component, said auxiliary strut being connected to the free portion of the spring means and being in substantial alignment with the direction of yielding flexibility of the latter.

4. The combination of claim 3, wherein said one of the connecting means connects the free portion of the spring means and the auxiliary strut.

5. The combination of claim 1, wherein the transport is a watercraft and is adapted to be supported on water when immersed therein to an approximately predetermined depth, said ground wheel being at least largely disposed below said depth of watercraft immersion when the main strut is in the first position, and said ground wheel being of the pneumatic type and at least sufficiently buoyant with respect to water as to urge the main strut from its first and towards its second position when the watercraft has said depth of water immersion, and said ground wheel being at least largely disposed above said depth of watercraft immersion when the main strut is in its second position.

6. The combination of claim 5, wherein said watercraft is a raft and wherein said raft comprises said frame and a plurality of longitudinally extending pontoons secured to and depending from said frame, said raft having a forward end provided with tow hitch means, and said main strut being downwardly and rearwardly inclined when in its first position with the ground wheels extending below the bottom of the pontoons.

7. The combination of claim 5, including a second retractable wheel system, with the first defined system and the second system being disposed on opposite sides of the raft at positions intermediate the longitudinal extent of the raft.

8. The combination of claim 7, wherein the means for detachably securing the main strut comprises a link carried by the frame and which is detachably secured to the main strut.

9. In a retractable wheel system, the improvement comprising a frame element, an elongated main strut having a first end pivotally mounted on the element for swinging movement about a horizontal axis and a second end portion that is horizontally and laterally offset for accommodating a ground wheel alongside such second end portion in a vertical plane coincident with the pivotal mounting of the main strut, said main strut being downwardly inclined from the frame element in one direction, a stub axle carried by the second end portion of the main strut parallel to the axis of the pivotal mounting of the main strut, a ground wheel mounted on the stub axle for rotation in said vertical plane, a leaf spring in said vertical plane having one end fixed to the frame element and extending therefrom in said one direction in spaced relation above the main strut to terminate in a free end that is yieldingly flexible and disposed directly above the main strut and in said vertical plane, an elongated auxiliary strut disposed in said vertical plane and having a lower end disposed intermediate the horizontal axis and the ground wheel and which is pivotally secured to the main strut about an axis parallel to the axis of the pivotal mounting of the main strut for swinging movement in said vertical plane in an arrangement such that the auxiliary strut can be swung to a position of repose resting upon the ground wheel, said strut having an upper end, and means detachably connecting the upper end of the auxiliary strut to the free end of the spring, whereby the auxiliary strut can selectively oppose closing and opening movement of the main strut with respect to the free end of the spring, and whereby the main strut can be swung upwardly when the auxiliary strut is detached from the free end of the spring and swung into a position of repose on the ground wheel.

10. The combination of claim 9, including means for releasably retaining the main strut against downward swinging movement when the auxiliary strut is in its position of repose.

References Cited
UNITED STATES PATENTS

| | | | |
|---|---|---|---|
| 2,719,726 | 10/1955 | Johnston | 280—414 X |
| 2,835,400 | 5/1958 | Latzke | 280—414 X |
| 3,114,157 | 12/1963 | Stockmann | 9—1 X |

MILTON BUCHLER, *Primary Examiner.*

TRYGVE M. BLIX, *Examiner.*